Aug. 15, 1961      R. S. BEZARK      2,995,833
ANATOMICAL DEVICE
Filed June 10, 1959      4 Sheets-Sheet 1
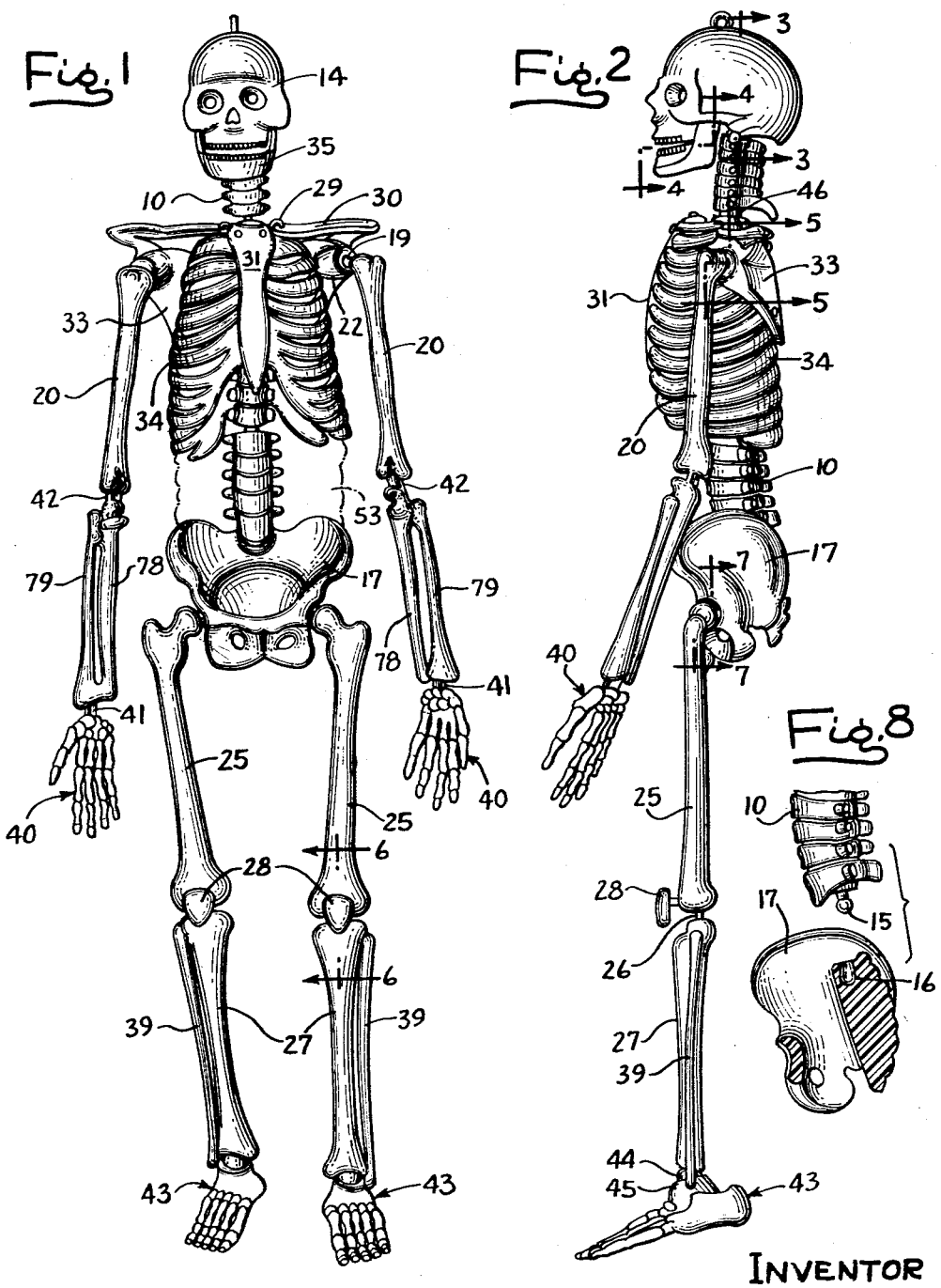
INVENTOR
RICHARD S. BEZARK
by: Gary, Desmond & Parker
ATTYS.

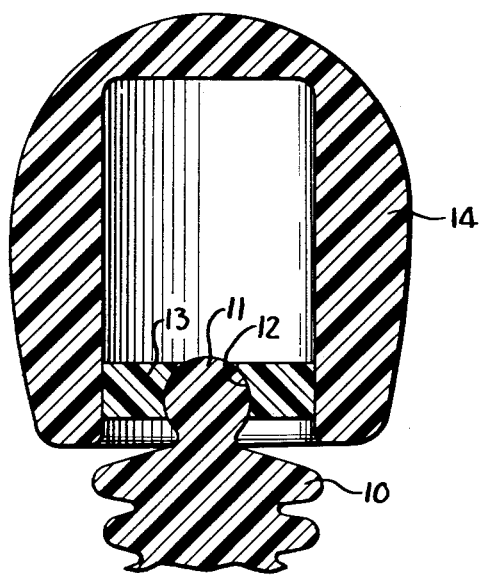
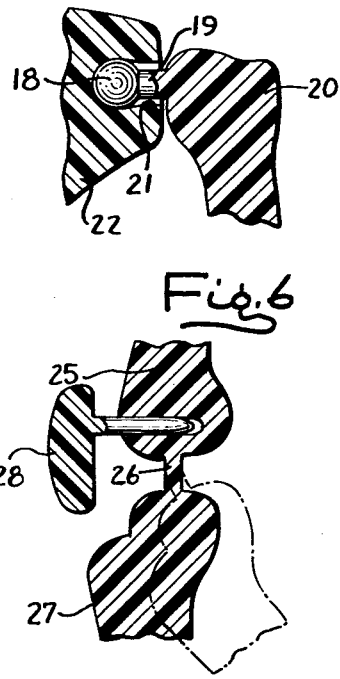
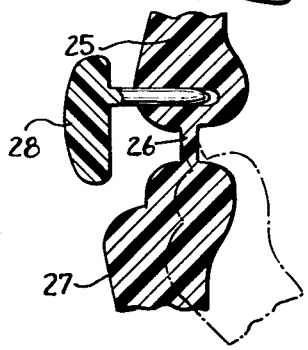
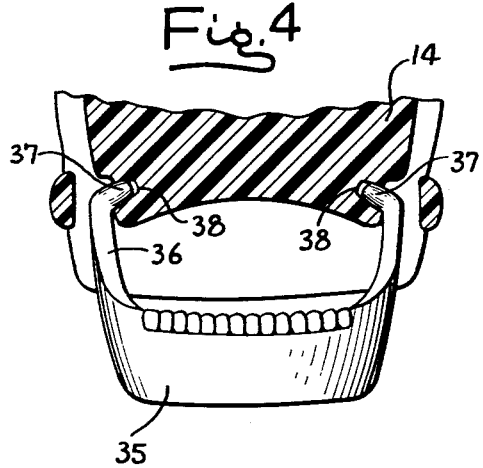
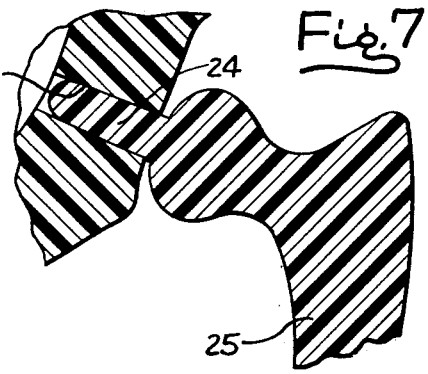

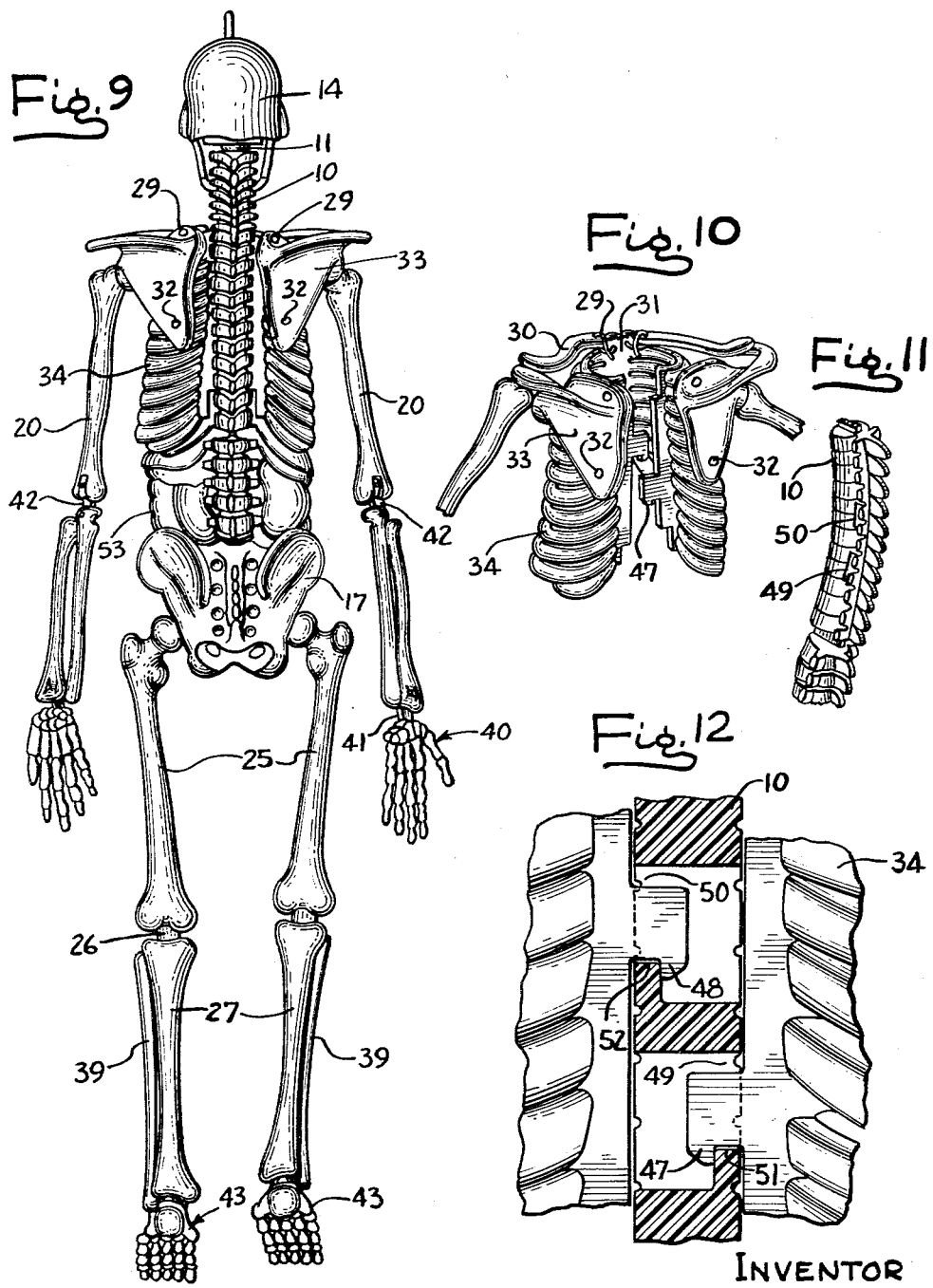

Aug. 15, 1961    R. S. BEZARK    2,995,833
ANATOMICAL DEVICE
Filed June 10, 1959    4 Sheets-Sheet 4

INVENTOR.
RICHARD S. BEZARK
BY
Gary, Desmond & Parker
ATTYS.

United States Patent Office 2,995,833
Patented Aug. 15, 1961

1

2,995,833
ANATOMICAL DEVICE
Richard S. Bezark, Glencoe, Ill., assignor, by mesne assignments, to Superior Plastics, Inc., Chicago, Ill., a corporation of Illinois
Filed June 10, 1959, Ser. No. 819,412
4 Claims. (Cl. 35—17)

This invention relates to a novel articulated anatomical educational device, and particularly to a simulated skeleton composed of synthetic plastic material adapted for demonstrating the connection between various joints of the skeleton such as hinged and ball and socket joints, and the various components such as bones, vertebra, and the like, both visually and by manipulation.

It is a further object of the present invention to provide a simulated human frame comprised of movable and detachable components or assemblies adapted for quick assembly or separation and adapted for use by students of anatomy, science, medicine, modeling, sculpturing, sketching, painting, etc.

Characterizing features of the present invention are the various means for articulating and disarticulating the various components or assemblies, in part brought about by the component material of which the skeleton frame is composed, namely, a plastic of relative rigidity although being flexible in thin sections and which is more or less pliable and of a tough rather than brittle character, exemplified by high density polyethylene sold under the trademark Marlex 50 by Phillips Chemical Company.

Use of such plastic material enables production of ball and socket joints wherein the ball is relatively rigid and the socket may be of somewhat flexible character to resiliently receive the ball in pressed frictional engagement; or wherein tapered components may be telescoped in complementary seats and similarly pivotally and frictionally engaged therein; and whereof other flexible hinge joints may be provided, as will more particularly appear hereinafter.

It is a further object of the present invention to include in the aforesaid simulated human frame or skeleton, and within the separable confines thereof, simulated vital organs in internested, interdigited and interlocked engagement with each other for facilitating illustration and teaching of the said organs, and for facilitating and understanding of the shape and form which may be required in addition to spatial and visual relationship.

Other objects and advantages of the present invention, the arrangement of parts and the economies thereof will be apparent from a consideration of the following specification and the accompanying drawings, wherein:

FIG. 1 is a front elevational view of a simulated skeleton in accordance with the present invention; and FIG. 2 is a side elevational view thereof.

FIG. 3 is an enlarged sectional detail on the line 3—3 of FIG. 2.

FIG. 4 is an enlarged sectional detail on line 4—4 of FIG. 2.

FIG. 5 is an enlarged sectional detail on line 5—5 of FIG. 2.

FIG. 6 is an enlarged sectional detail on line 6—6 of FIG. 1.

FIG. 7 is an enlarged sectional detail on line 7—7 of FIG. 2.

FIG. 8 is an exploded fragmentary detail with parts in section illustrating means for joining the simulated spinal column to the pelvis.

FIG. 9 is a rear elevational view of the simulated articulated human frame or skeleton shown in FIG. 1 with added showing of embraced internal organs.

FIG. 10 is a perspective view of the rib cage with

2 parts spaced and illustrating means for joining same with the simulated spinal column.

FIG. 11 is a perspective fragmentary view of the spinal column illustrating slots for receiving the joining or bayonet means shown on the rib cage of FIG. 10.

FIG. 12 is an enlarged fragmentary detail view through the spinal column of FIG. 11 showing the interlocked engagement therewith of the separable engagement means on the rib cage shown in FIG. 10.

Figure 13:
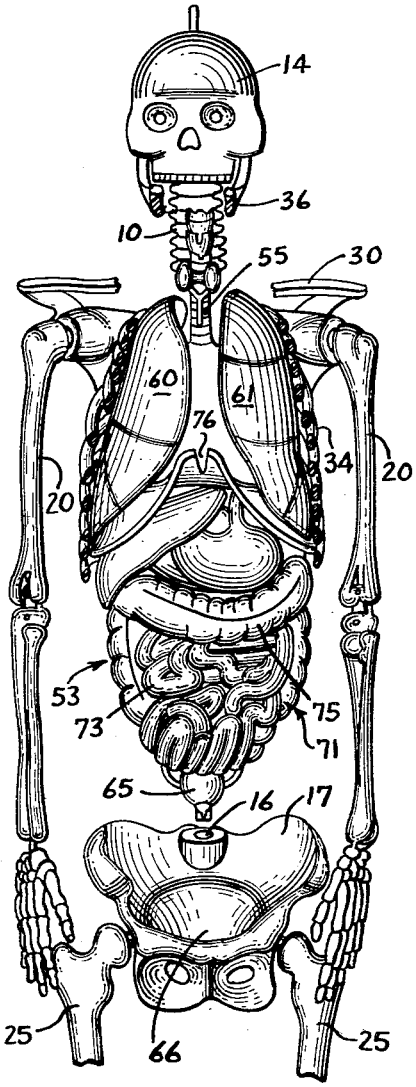

FIG. 13 is a fragmentary front elevational view of the skeleton shown in FIG. 1 with parts, i.e., the pelvis separated, and with the internal organs assembled and disposed within the simulated skeleton.

Figure 14:
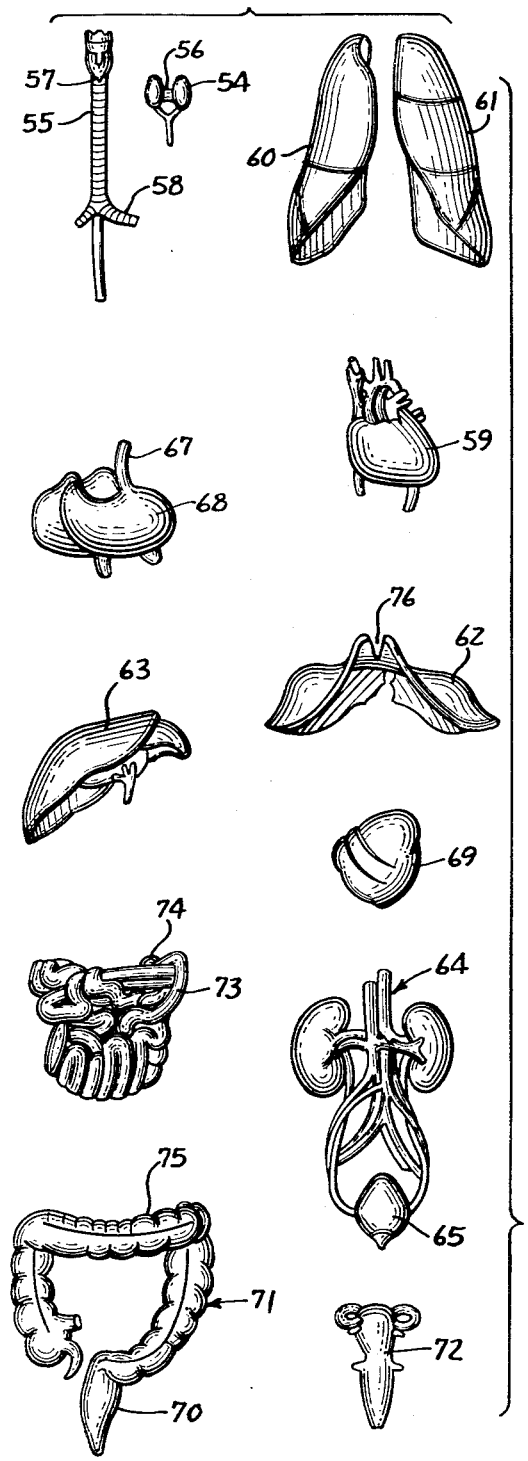

FIG. 14 is an exploded front elevational view of the component internal organs shown assembled in FIG. 13.

Referring to the drawings, reference numeral 10 illustrates a simulated spinal column which may be formed in a single rigid piece but molded to illustrate the vertebra. The upper portion of the spinal column suitably terminates in a ball 11 as best shown in FIG. 3 for reception in the socket 12 formed in the skull base portion 13, the socket being such that it is sufficiently resilient to receive and frictionally press the ball 11, the socket 12 having sufficient arc to retain the ball 11 for relative movement in a frictional fit so that the skull 14 may be positioned at various angles relative to the spinal column 10.

The base of the spinal column 10 is also provided with a ball 15 similarly receivable in the socket 16 formed in the pelvis 17 whereby the spinal column may be joined in secure, separable, frictional and rotatable engagement with the pelvis 17, and for aiding in receiving and securing the abdominal or vital internal organs separately shown in FIG. 14, as will be more particularly hereinafter described.

A similar ball and socket joint is shown in the detail of FIG. 5 wherein a ball 18 is shown to be carried on the stem 19 projecting laterally from humerus 20, the ball 18 being received in the socket 21 formed in the scapula 22, it being understood that a pair of such arrangements are provided, one for the manipulation of each of the simulated humerus bones and its appendages.

Another type of joint is that shown by the recesses 23 on the pelvis, which are tapered, for receiving a conical stem 24 on the upper portion of the femur 25 whereby the femur and its appended components may be frictionally engaged and moved rotatably relative to the pelvis.

Another type of articulation means are integral web portions such as the web portion 26 connecting the lower end of the femur with the upper end of the tibia 27, the section 26 being sufficiently thin so as to provide a hinge which may be flexed in desired manner. It will be understood that in the alternative, although not shown, the integral flexible hinge 26 may be replaced with the ball and socket joint such as that shown in FIGS. 3 and 5, or with the rotative pin and socket joint of FIG. 7.

As a further alternative, the hinge 26 being relatively thin may be readily severed by shears and the femur 25 and the tibia 27 may be connected together adjacent the simulated kneecap 28 by means of bent metal pins as, for example, the pins 29 which connect the clavicle 30 to the sternum 31 as illustrated in FIG. 10 and elsewhere, or the similar pins 32 which secure a scapula 33 to suitable portions of the rib cage 34.

Another type of joint is shown in detail in FIG. 4 wherein a lower jaw or mandible 35 is provided with a pair of relatively flexible arm portions 36 terminating in the inwardly extending ends 37, 37 receivable in the sockets 38, 38 in the skull 14. Thus the mandible 35 is maintained in movable engagement on the terminals 37, 37 with the skull 14 and its sockets 38, 38 so that it is held in fairly secure frictional and resilient engagement, to the extent that the jaw 35 may be moved and temporarily retained in the desired pivotal relationship to the skull or its upper jaw portion.

On the other hand, it will be apparent that other portions can be fixedly secured, such as the fibula 39 which is integrally secured at its upper and lower ends to its companion tibia 27. The same holds true, for example, with such groups as the bones of the hand which are secured as a group 40 by means of a flexible hinge 41 to the radius 78 and its companion ulna 79, these being connected by a flexible hinge point 42 such as than shown in FIG. 6.

Similarly, the bones of the foot collectively indicated as 43 may be secured to the tibia 28 by means of a ball 44 at the end of the tibia seated within a socket, not fully shown, at the upper portion 45 of what might be considered the talus bone in a joint similar to that shown in FIG. 3, whereby the foot can be manipulated and disposed in various positions relative to the bones of the leg.

Although the spinal column may be in a single, relatively rigid unit, it may be provided with either hinge type joints such as shown in FIG. 6, or ball socket type joints such as shown in FIG. 3 at intermediate points as at 46.

As shown in the details of FIGS. 10–12, the rib cage 34, which is preferably formed of a single unit with the sternum 31, is split rearwardly and provided at the opposed terminal edges or lines of fusion with the hooks or bayonets 47, 48 receivable, respectively, in the slots 49 and 50 formed in the spinal column 10. It will be noted that the hook or bayonet 47 is of a length so that it may pass freely in the opening 49 to by-pass the ledge 51 and anchor thereover. The same applies to the hook or bayonet 48 which in a similar manner anchors over the ledge 52. The hooks 47 and 48 may be withdrawn and disengaged from the spinal column by twisting the rib cage, which is of relatively thin section and of enhanced flexible nature. The illustration of FIGS. 10–12 thus shows another means of assembling the parts composed of the described tough plastic material which is relatively flexible or relatively rigid, depending to some extent on the thinness or thickness of the section.

As previously indicated and as shown dotted at 53 in FIG. 1, or in full in the rear view at 53 in FIG. 9, and more particularly the full assembly view of FIG. 13, the simulated internal organs are adapted to be internested and disposed between the rib cage 34 and the pelvis 17 and separably contained in the simulated skeleton by means of the ball 15 and socket 16, when this is the only separable means on the spinal column.

Thus referring particularly to the detail components of Fig. 14, the thyroid 54 is secured to the trachea or windpipe 55 by means of a pin, not shown, at the rear of the web portion 56 between the thyroid glands, projectable in the aperture 57 on the windpipe. Thereafter a lateral branch 58 on the trachea is inserted into an aperture (not shown) in the rear of the heart 59 opening under the aorta arch. Thereafter one places the left lung 60 on the left side of the aforesaid three-component assembly and then the right lung 61 on the right side. Following this, the diaphragm 62 is disposed in position under the heart and lungs, and the liver 63 is placed underneath the right side of the diaphragm (left side as viewed in the accompanying drawings) and the assembly 64 of the kidneys and bladder disposed in position with the point of the bladder 65 projecting downwardly toward the opening 66 of the pelvis 17.

Thereafter one inserts the esophagus tube 67 of the stomach 68 upward into a central hole (not shown) on the diaphragm 62, followed by insertion of the spleen 69 above and behind the stomach into a companion seat in the diaphragm. Then the point 70 of colon 71 is inserted behind the bladder 65 and the upper part of the colon is pushed with the thumb against the stomach until it snaps into place around the right edge thereof in a resilient frictional bit. Thereafter the uterus 72 is inserted between the bladder 65 and lower portion 70 of the colon and the upper edge of the small intestine 73 is slid up inside the colon or large intestine 71 by engaging the lug portion 74 beneath an edge of the transverse portion 75 of the large intestine, and then pressing the lower edge portion of the small intestine 73 against the colon or large intestine 71 so as to bring the rearward projection in the former (not shown) into interlocking engagement with the latter in a frictional fit.

This assembly of the intestines may then be disposed as a unit upwardly through the rib cage 34 so that the cleft 76 in the diaphragm 62 receives and abuts against the tip portion 77 of the sternum, following which the pelvis is brought up into embracing engagement with the lower extremities of the assembled internal organs previously described, several portions of which then project into the aperture 66 of the pelvis, following which the ball 15 at the base of the spine is snapped into engagement in the socket 16 at approximately the sacrum of the pelvis, to form a secure assembly.

Although the components of the internal organs may be composed of the same material as that of the skeleton or frame, preferably they are composed of a less flexible material such as the synthetic plastic cellulose acetate, which may be colored more readily in suitable contrasting color to the frame or skeleton portion previously described.

Although the internal organs may be colored to contrast with the simulated bones of the frame or skeleton, the components of the skeleton are also suitably of a color simulating that of natural bone, providing a model which explains and demonstrates the connection between the bones and vital organs, both visually and by manipulation.

It will thus be apparent that the aforesaid internal or vital organs are securely received within the thoracic, abdominal and pelvic cavities and securely retained between the separable assembly of the rib cage and pelvis showing true appearance, proportion and neighbor relationship of the component organs nested together substantially as in life, enhancing understanding of their shape and form.

Although I have illustrated and described the preferred embodiment of my invention and various modifications of the details thereof, other modifications will become apparent to those skilled in the art within the scope of the appended claims.

I claim:

1. An anatomical device comprising a plurality of separably joined articulated simulated human skeletal components composed of resilient flexible plastic material including a spinal column, a skull separably engaged to its upper end portion, a rib cage separably engaged to its intermediate portion, a pelvis separably secured to its base portion, and a plurality of internested simulated human internal organ components disposed and removably held within the resulting thoracic, abdominal and pelvic cavities by and between said rib cage and pelvis.

2. An anatomical device comprising a plurality of separably joined articulated simulated human skeletal components composed of resilient flexible plastic material including a spinal column, a skull separably engaged to its upper end portion, a rib cage separably engaged to its intermediate portion and a pelvis separably secured to its base portion, said rib cage comprising a sternum and a pair of rib groups each integrally joined thereto at their forward ends and integrally joined at their rearward ends to separate strips disposed substantially parallel to said sternum, and means carried by said strips separably engageable with means formed on said spinal column providing said separable engagement.

3. An anatomical device comprising a plurality of separably joined articulated simulated human skeletal components composed of resilient flexible plastic material, including a rigid spinal column and a flexible rib cage, said rib cage comprising a plurality of ribs integral with a sternum and terminating rearwardly in separate transversely extending integral strips whereby the rib cage may be flexed open, each of said rearward strips carrying laterally projecting longitudinally spaced hook means receivable in complementary spaced slots formed in said spinal column for interlocking said components.

4. An anatomical device comprising a plurality of separably joined articulated simulated human skeletal components composed of resilient flexible plastic material, including a simulated rigid spinal column and skull seated on one end thereof, one of said two components comprising a ball disposed in pressed yieldable frictional engagement in a socket formed in the other, and a separate mandible or lower jaw portion terminating in a pair of inturned flexible ends yieldably disposed in pressed frictional pivotal engagement in companion sockets formed in said skull.

References Cited in the file of this patent

UNITED STATES PATENTS

| | | |
|---|---|---|
| 983,547 | Fleck | Feb. 7, 1911 |
| 2,483,034 | Braeg | Sept. 27, 1949 |
| 2,662,335 | Calverley | Dec. 15, 1953 |
| 2,752,697 | Lawall | July 3, 1956 |

FOREIGN PATENTS

| | | |
|---|---|---|
| 651,015 | Germany | Oct. 6, 1937 |
| 699,055 | Germany | Nov. 21, 1940 |

OTHER REFERENCES

"British Plastics," December 1949, pp. 634–639.

"Durolatex Models of Human Anatomy," catalogue of the Chicago Apparatus Co., Chicago, Ill.

UNITED STATES PATENT OFFICE
CERTIFICATE OF CORRECTION

Patent No. 2,995,833                            August 15, 1961

Richard S. Bezark

It is hereby certified that error appears in the above numbered patent requiring correction and that the said Letters Patent should read as corrected below.

In the grant, line 3, and in the heading to the printed specification, lines 4 and 5, for "a corporation of Illinois", each occurrence, read -- a corporation of Delaware --.

Signed and sealed this 16th day of January 1962.

(SEAL)
Attest:

ERNEST W. SWIDER                                        DAVID L. LADD
Attesting Officer                                           Commissioner of Patent